Jan. 11, 1966    L. W. PARKER    3,229,208
SENSITIVITY ADJUSTMENT SHUNTS FOR COMPENSATING FOR PRODUCTION
VARIATIONS IN ELECTRICAL INDICATING INSTRUMENTS
Filed Jan. 25, 1963
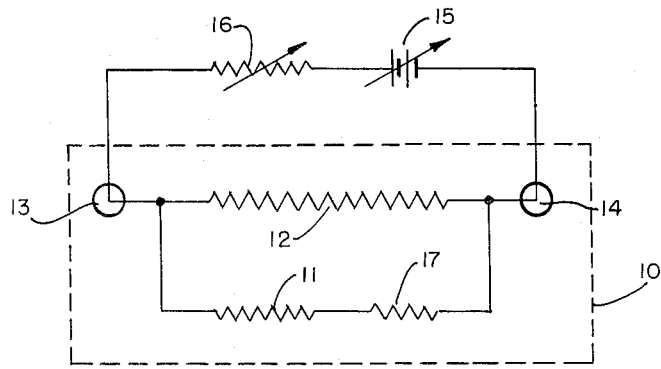
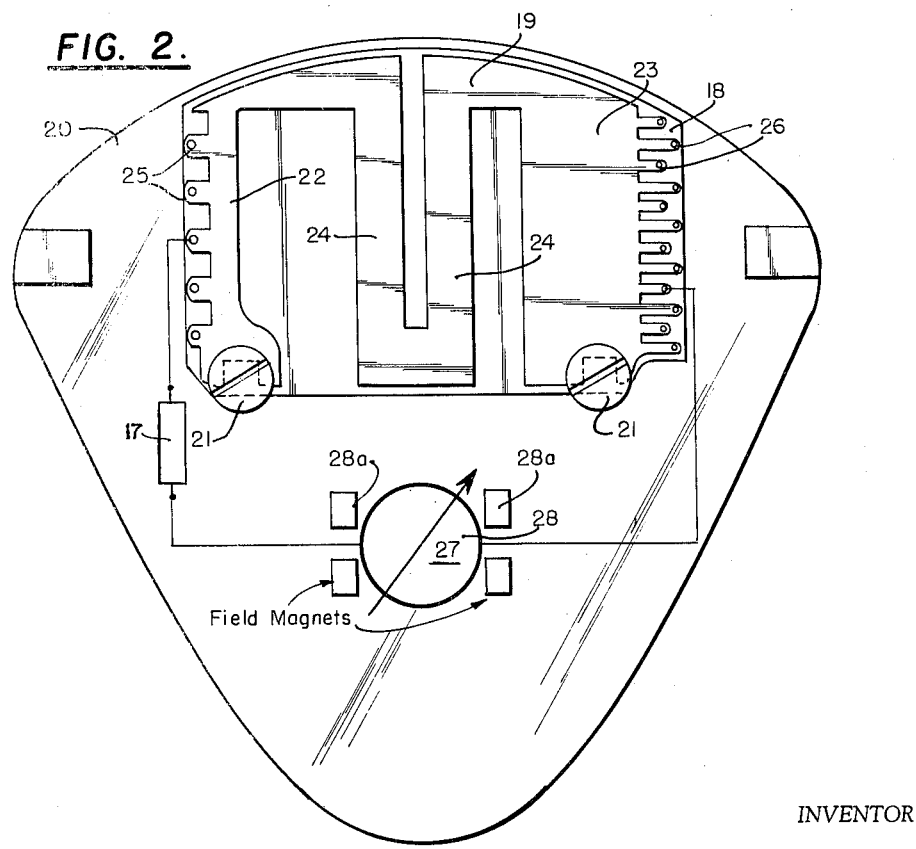
INVENTOR
Louis W. Parker
BY Moore, Hall & Pollock
ATTORNEYS United States Patent Office 3,229,208
Patented Jan. 11, 1966

3,229,208
SENSITIVITY ADJUSTMENT SHUNTS FOR COMPENSATING FOR PRODUCTION VARIATIONS IN ELECTRICAL INDICATING INSTRUMENTS
Louis W. Parker, Oyster Bay Cove, N.Y. (2040 N. Dixie Highway, Wilton Manors, Fla. 33305)
Filed July 25, 1963, Ser. No. 297,612
4 Claims. (Cl. 324—126)

The instant application comprises a continuation-in-part of my prior copending application Serial No. 52,931, filed Aug. 30, 1960 for "Temperature and Field Density Compensators for Electrical Indicating Instruments," now U.S. Patent No. 3,112,444, issued Nov. 26, 1963.

The present invention relates to shunt structures for use in conjunction with electrical indicating instruments, e.g., meters, and adapted to alter the sensitivity of the instrument or meter movement as may be desired; and is more particularly concerned with a novel shunt performing not only the foregoing function, but also arranged to compensate for production variations in the meter movement and, in addition, to compensate at least partially for changes in deflection due to ambient temperature variations.

As is well known at the present time, electrical indicating instruments or meter movements may comprise a rotor structure mounted on pivots and regulated by hair springs, said rotor being located between or adjacent to an appropriate magnet structure preferably of the permanent type, whereby a source of current to be measured (or a variable current due to variation in voltage or resistance coupled to said rotor) may cause said rotor to move through an appropriate arc corresponding to the parameter being measured. In such instruments, it has been recognized that some inaccuracy may arise due to variations in ambient temperature, particularly due to variations in the resistance of the meter movement itself, e.g., the rotor coil, which occur as a result of significant changes in temperature adjacent the coil.

One such electrical indicating instrument is described in my prior U.S. Patent No. 3,056,923, issued Oct. 2, 1962 for "Indicating Instruments and Magnetic Structures Therefor." The structure described in this prior patent comprises a substantially disc-shaped rotor, preferably formed of an anodized aluminum plate having copper deposits of coil configuration on the opposed surfaces thereof. This rotor is in turn mounted adjacent a permanent magnet of unique configuration, taking the form of a flat annular magnetic surface disposed generally parallel to the plane of the disc rotor. This arrangement is, in my prior patent described to have various advantages.

The magnet structure may comprise a ceramic magnetic material; but I prefer to employ Alnico 8 as the magnetic material, in place of said ceramic magnetic material, when the instrument is subjected to extreme changes of temperature, due to the very low effect that temperature has on such Alnico magnets. The rotor of the instrument, comprising a coil structure of copper or other conductor material, normally exhibits a positive temperature coefficient of resistivity. For this reason, even if Alnico is employed in the magnet structure, the current through the rotor coil drops with increasing temperature when a fixed small voltage is applied across said rotor coil. This same operation normally occurs when a low resistance shunt is connected in parallel with the instrument movement; and the present invention, by recognizing this fact, utilizes the novel shunt to be described to effect at least partial temperature compensation of the rotor coil.

Another difficulty characteristic of the aforementioned instrument arises due to production variations in the sensitivity of meter movements occurring during manufacture of the instrument. While such variations can be minimized by extreme and expensive quality control procedures, I have found it advantageous and far less expensive to permit substantial variations in sensitivity to occur, during manufacture, between different meter movements; and, thereafter, to obtain proper meter indications by connecting those movements across various proper portions of my novel shunt. For example, more sensitive movements are connected across a smaller portion of the shunt, whereby such more sensitive movements receive lower voltages while less sensitive movements can be connected across a larger portion of the shunt structure. A considerable range of such possible shunt connections is provided by the shunt structure of the present invention, thereby permitting a wide range of production sensitivity variations to be effectively eliminated, whereby all the meter movements effectively have the same sensitivity, through the simple expedient of appropriately connecting the meter movements to proper portions of the shunt structure.

It is accordingly an object of the present invention to provide an improved shunt structure adapted to enable the use of meter movements over a comparatively wide range of sensitivities, including sensitivity variations due to normal production variations in the meter movement as well as in the shunts themselves.

A further object of the present invention resides in the provision of an improved shunt structure adapted to not only change the range of an electrical indicating instrument but also to effect temperature compensation of said instrument.

Another object of the present invention resides in the provision of a novel shunt structure adapted to compensate for production variations in a number of meter movements, whereby plural meters of substantially identical sensitivity may be provided more readily and less expensively than has been possible heretofore.

A still further object of the present invention resides in the provision of an electrical indicating instrument associated with a shunt and so arranged as to eliminate any error in reading due to contact resistance between the connecting terminals and the shunt.

Still another object of the present invention resides in the provision of a novel shunt structure having plural groups of connection points electrically related to one another in a predetermined manner.

In providing for the foregoing objects and advantages, the present invention contemplates the provision of an electrical indicating instrument, preferably of the type described in my aforementioned prior U.S. Patent No. 3,056,923 associated with a shunt structure arranged and comprising materials adapted not only to effect changes in indicating range and/or sensitivity of the instrument, but also adapted to effect temperature compensation. The arrangement, and the materials, of the shunt structure are preferably related to the materials and temperature coefficient of the rotor structure in such manner that the shunt and rotor exhibit different temperature coefficients of resistivity of the same sense; and the difference between the temperature coefficients of the shunt and rotor is so selected as to provide a substantially constant meter indication at various ambient temperatures.

In this respect, therefore, as will become apparent hereinafter, one feature of shunts constructed in accordance with the present invention resides in its consisting of a low temperature coefficient material, ordinarily a metal, having a temperature coefficient of resistance, different from that of the meter rotor coil. The reason for using a shunt having a temperature coefficient of resistivity different from the coefficient of the rotor coil arises from the partial temperature compensating effect produced by meter movement hairsprings. An increase in ambient temperature tends to increase the rotor coil resistance, and accordingly reduces the current through the rotor coil and so lowers the meter deflection. However, such an increase in ambient temperature also tends to weaken the meter hairsprings, and this in turn tends to increase the meter deflection. The two effects are of opposite sense, whereby one tends to compensate for the other with a change in temperature. Inasmuch as the hairspring effect is less than the rotor resistance change effect, for a given increase in temperature, the net result is still a drop (although of smaller magnitude) in the deflection. This resultant drop is compensated for in accordance with one aspect of the present invention, by use of a shunt exhibiting a moderate increase in shunt resistance (of a magnitude less than that of the rotor resistance increase) with an increase in temperature.

Consequently, even when the meter uses a magnet which is itself almost unaffected by temperature, e.g., an Alnico magnet, some temperature compensation is still necessary; and, in particular, shunts provided in accordance with the present invention must still exhibit a moderate temperature coefficient of resistivity to compensate for changes in resistance of the copper coil with changes in temperature, and this is so even though the effect of the rotor coil resistance change is compensated in part by a change in elasticity of the meter hairsprings.

The shunt of the present invention, in addition to the features described above, is further characterized by a plurality of tap connection points, spaced from one another in a related manner, thereby to permit various interconnections between the shunt and any given meter movement. By selection of the proper connections, production variations in either the meter movement or in the shunt structure, occurring during the manufacture of either, can be effectively and readily eliminated.

The foregoing objects, advantages, construction and operation of the present invention will become more readily apparent from the following description and accompanying drawings, in which:

FIGURE 1 is an illustrative equivalent schematic of a shunted meter structure constructed in accordance with the present invention; and FIGURE 2 is an illustrative view of an improved shunt constructed in accordance with the present invention and associated with a schematically depicted meter movement.

In FIGURE 1, a schematically illustrated meter movement has been designated at 10. This meter movement 10 comprises a rotor resistance 11 (which may be connected in series with another compensating resistance 17, to be described hereinafter); and the rotor 11 may in turn be connected across all or a portion of a temperature and/or sensitivity compensating shunt 12. The opposing ends of the shunt 12 are in turn coupled to terminals 13, 14 which are supplied by current from a source 15 through a load 16; and either or both of components 15 and 16 may be variable, the arrangement 15, 16 corresponding to the external source which is to be measured by the instrument or which is employed to control movement of the rotor 11.

In order to analyze the arrangement shown in FIGURE 1, it is first assumed that the current through shunt 12 is very much greater than that through meter coil 11 (and resistance 17, if such resistance be provided). As a result, the change in voltage drop across shunt 12 is assumed to be substantially negligible when the rotor coil 11 and shunt 12 are paralleled as illustrated. The rotor 11, composed of copper, exhibits a positive temperature coefficient of resistivity wherefore the resistance of meter coil 11 will increase about 0.4% for each degree centigrade increase in temperature.

In order to compensate for the aforementioned resistance change of the meter coil 11, the shunt 12 may, in accordance with one embodiment of the invention, be made of brass (Cu 66%—Zn 34%). Shunt 12 accordingly also exhibits a positive temperature coefficient of resistivity, but of lesser magnitude than that of copper rotor 11, i.e., when brass is utilized, the resistance of shunt 12 tends to increase approximately 0.2% for each degree centigrade increase in temperature. If we for the moment ignore resistance 17, i.e., it is assumed that resistance 17 is short circuited, the differences in temperature coefficient of resistivity of the brass shunt 12 and copper coil 11 therefore produce a decrease in current through rotor resistance 11, for each degree centigrade increase in temperature, of substantially 0.2% minus 0.4%; or a resultant change of minus 0.2%.

In addition to the foregoing considerations, it has also been found that there is a change in elasticity of the hairsprings in the meter of 0.04% in the positive direction, whereby the change of elasticity of the hairsprings partially compensates for the change of resistance in the rotor. This partial compensation is such that the resultant negative 0.2% change of sensitivity described above, when partially compensated by the positive 0.04% change in elasticity of the hairspring, still leaves a negative 0.16% change in sensitivity for each degree centigrade increase in temperature.

This small temperature error can be further compensated and substantially completely eliminated by the addition of a further temperature compensating resistance 17 in series with the rotor resistance 11, the series connected rotor resistance 11 and temperature compensating resistance 17 being connected as illustrated across brass shunt 12. This further temperature compensating resistance 17 should be selected of a material having substantially zero temperature coefficient of resistivity, e.g., manganin, manganese-copper, or the like.

The purpose of resistance 17 is to reduce the combined temperature coefficient of rotor coil 11 and added resistance 17 from the 0.4% change exhibited by the rotor alone to a resultant change of substantially 0.24%. This reduction of effective resistance change from 0.4% to 0.24%, in the rotor circuit, is required to balance the sum change of 0.2% resistance in the brass shunt and 0.04% change in elasticity in the hairspring, thereby resulting in a substantially zero temperature coefficient in the overall meter. To accomplish this result, the zero coefficient resistor 17 should be 0.67 times as high in value as the resistance of the copper meter coil 11. In this way, by adding resistor 17, the total resistance of the meter branch comprising coil 11 and said added resistance 17 (see FIGURE 1) is increased by 60% over the resistance value of the coil 11 alone; but the total change, with an increase in temperature for each degree centigrade, is still the same as would be the case without this addition, i.e., 0.4% of soil resistance 11.

With this alteration, a temperature increase of one degree centigrade will increase the voltage across the brass shunt 12 by 0.2% but will increase the resistance across the copper coil 11 and added zero temperature coefficient resistor 17 by 0.24%. As a result, there will be a drop in the current through the meter coil 11 of approximately 0.04% which is equal in magnitude and opposite in sense to the change in sensitivity of the meter movement due to the temperature characteristics of the meter hairsprings, as already described.

It should be noted, of course, that in all the previous calculations it has been assumed that the voltage across the shunt does not drop when the meter movement is connected across it. Inasmuch as this is only approximately true, the calculations given above are also only approximate; but the basic principles nevertheless apply.

Under certain conditions, the use of a zero temperature coefficient resistor of the high value discussed above may not be practical, due to its effect in reducing the overall sensitivity of the meter movement. In such cases, other metals than brass, having higher temperature coefficients may be employed in shunt 12. It is obvious from the foregoing that when shunt 12 comprises a material having a temperature coefficient higher than that of brass, the required value of resistor 17 will simultaneously be lowered. One such alternative metal which may be employed in shunt 12 (for compensating a copper rotor coil) is molybdenum, having a temperature coefficient of 0.33%; and another metal which may be used is Phosphor bronze with a coefficient of 0.3%, or any other alloy with suitable characteristics.

The physical embodiment of a preferred shunt corresponding to shunt resistance 12 of FIGURE 1 is illustrated in FIGURE 2. The shunt itself preferably comprises a lamination 19 of sheet brass (or other metal, as described) mounted on an insulated supporting surface 18, with said supporting surface 18 and lamination 19 being in turn held on a backing plate 20 comprising the back surface of the entire meter movement, as described in my prior United States Pattent No. 3,056,923. Insulating structure 18 and lamination 19 may in fact be held on said backing plate 20 (which is preferably constructed of plastic) by a pair of screws 21 passing through the shunt 18–19 and through apertures in the backing plate 20. Screws 21 comprise conductive material, wherefore they also serve the purpose of conducting current to and through the shunt; and to this effect, the opposing ends of the shunt are arranged to electrically contact the screws 21, as illustrated, wherefore screws 21 correspond to the terminals 13 and 14 already discussed in reference to FIGURE 1.

Lamination 19, comprising the shunt resistance itself, is preferably of convolute configuration, and includes a pair of outer linear members 22 and 23 connected to a pair of interconnected inner members 24, as illustrated. The lower ends of the outer members 22 and 23 engage supporting and terminal screws 21; and, as also illustrated, the outer linear members 22 and 23 are of different widths, whereby current may be caused to flow through the convolute lamination to produce a voltage drop having a non-linear distribution between the terminal screws 21. Each of the outer different width members 22 and 23 is also formed to provide a plurality of tap connections or lugs arranged in groups as shown, with member 22 being provided with a group of tap connections 25, while member 23 is provided with a further group of tap connections 26 which may be differently spaced from the spacing between connections 25.

The several tap connections 25 and 26 are so located that the voltage drop between each pair of adjacent taps 25 is in the order of 5% of the total drop across the shunt, whereas the voltage drop between each pair of adjacent taps 26 is in the order of 1% of the total drop across the shunt. Meter movement 27, comprising a rotor 28 associated with magnetic structures 28a, is connected as shown to one of said taps 25 as well as to one of said taps 26; and due to the range of voltages which are available at the several taps 25 and 26, production variations in the sensitivity of the meter or production variations in the shunts themselves, can be taken up by appropriate selection of the taps 25 and 26 for use in connecting the meter movement 27.

By way of example, in the case of a one ampere shunt, one ampere may be sent through the combined shunt and meter movement and the unit may be calibrated to provide one ampere full-scale deflection by connecting the meter movement 27 to appropriate taps 25 and 26 which give such full-scale deflection, regardless of how many millivolts (within a reasonable range) such full-scale deflection may take.

In accordance with one of the specific improvements of the present invention, it should be noted that the meter movement 27 is, in accordance with the present invention, connected only to the shunt and not to terminals 21. As a result, any variation in contact resistance between terminals 21 and shunt 19 does not affect the voltage drop across the meter; and this represents a significant improvement over arrangements suggested heretofore, wherein the shunt is connected directly across the input terminals of the meter.

It should further be noted that the insulating supporting member 18 may take various forms. In the case of low current shunts (e.g., one ampere shunts) the shunt lamination 19 may be laminated directly on any conventional insulator such as Bakelite. The system, however, may also be employed to provide shunts for substantially higher currents through appropriate selection of the backing material 18; and in such higher current embodiments, the shunt lamination 19 can be applied to an insulated metallic supporting member, such as one of anodized aluminum, in which event the supporting member 18 acts as a heat sink.

Other variations will be apparent to those skilled in the art. The foregoing description is accordingly meant to be illustrative only, and all such variations and modifications as are in accord with the principles described are meant to fall within the appended claims.

Having thus described my invention, I claim.

1. In combination, a meter movement, and a shunt structure for adjusting the sensitivity of said meter movement to compensate for production variations occurring during fabrication of said meter movement, said shunt structure comprising an elongated metal sheet having a pair of spaced ends, means for a producing a voltage drop across spaced portions of said elongated sheet, a group of first sensitivity adjustment terminals spaced from one another along an edge portion of said sheet adjacent one of said spaced ends with the spacing between said first terminals being such that a predetermined first fractional portion of said voltage drop occurs between adjacent ones of said first terminals, a group of second sensitivity adjustment terminals spaced from one another along an edge portion of said sheet adjacent the other of said spaced ends with the spacing between said second terminals being such that a different fractional portion of said voltage drop occurs between adjacent ones of said second terminals, and means for connecting said meter movement between a selected one of said first sensitivity adjustment terminals and a selected one of said second sensitivity adjustment terminals thereby to achieve a desired meter sensitivity in a preselected operating range of said meter.

2. The structure of claim 1 wherein said metal sheet is of elongated configuration, the width of said sheet differing adjacent its said spaced ends.

3. A shunt structure for use with any one of a plurality of meters fabricated to operate over a preselected range but normally having different sensitivities in said range due to production variations occurring during fabrication of said meters, comprising a metallic lamination of convolute configuration mounted upon a supporting structure, said convolute lamination defining a pair of elongated end portions, terminal means for connecting said lamination to a source of current to be measured by a selected one of said meters in said preselected range, a first group of sensitivity adjustment tap connections spaced from one another along one of said elongated end portions, a second group of sensitivity adjustment tap connections spaced from one another along the other of said elongated end portions, the tap connections in each of said groups being so spaced from one another that the voltage drop between adjacent ones of the tap connections in each of said groups constitutes a predetermined fractional portion of the total voltage drop generated across said lamination when said lamination is connected to said source of current, whereby different ones of said meters may be individually connected to a shunt structure of the type described between different selected ones of said first tap connections and different selected ones of said second tap connections respectively thereby to effect a desired common meter sensitivity for any selected one of said meters during operation of said meter over said preselected range.

4. In combination, a meter movement, and a shunt structure for adjusting the sensitivity of said meter movement during operation of said meter movement in a preselected operating range, said shunt structure comprising a metal sheet having a pair of spaced ends, means coupled to said ends for producing a voltage drop across spaced portions of said sheet, a group of first terminals spaced from one another along an edge portion of said sheet adjacent one of said ends with the spacing between said first terminals being such that a potential difference in the order of 5% of said voltage drop occurs between adjacent ones of said first terminals, a group of second terminals spaced from one another along an edge portion of said sheet adjacent the other of said ends with the spacing between said second terminals being such that a potential difference in the order of 1% of said voltage drop occurs between adjacent ones of said second terminals, and means for connecting said meter movement between a selected one of said first terminals and a selected one of said second terminals in dependence upon the deviations of said meter movement sensitivity from a desired sensitivity.

References Cited by the Examiner

UNITED STATES PATENTS

| 1,614,174 | 1/1927 | Atwood | 324—126 |
| 1,667,624 | 4/1928 | Corson | 324—105 |
| 2,673,957 | 3/1954 | Rozett | 324—126 |

FOREIGN PATENTS 376,570   8/1907   France.

WALTER L. CARLSON, *Primary Examiner.*
RUDOLPH V. ROLINEC, *Examiner.*